US008548098B2

(12) United States Patent
 Shyu et al.

(10) Patent No.: US 8,548,098 B2
(45) Date of Patent: Oct. 1, 2013

(54) CLOCK-FREE ACTIVATION CIRCUIT

(75) Inventors: Jyn-Bang Shyu, Cupertino, CA (US); Robert Olah, Sunnyvale, CA (US); Rohit Mittal, Sunnyvale, CA (US)

(73) Assignee: Intelleflex Corporation, Santa Clara, CA (US)

( * ) Notice: Subject to any disclaimer, the term of this patent is extended or adjusted under 35 U.S.C. 154(b) by 2329 days.

(21) Appl. No.: 11/305,648

(22) Filed: Dec. 15, 2005

(65) Prior Publication Data

US 2007/0141983 A1    Jun. 21, 2007

(51) Int. Cl.
 *H04L 27/00* (2006.01)
 *H03D 3/22* (2006.01)

(52) U.S. Cl.
 USPC .......................................... 375/324; 375/329

(58) Field of Classification Search
 USPC .......................................................... 375/324
 See application file for complete search history.

(56) References Cited

U.S. PATENT DOCUMENTS

| | | | |
|---|---|---|---|
| 3,689,885 A | 9/1972 | Kaplan et al. | 340/152 T |
| 3,890,581 A | 6/1975 | Stuart et al. | 332/11 R |
| 4,325,146 A | 4/1982 | Lennington | 455/604 |
| 4,525,713 A | 6/1985 | Barletta et al. | 340/825.54 |
| 4,646,090 A | 2/1987 | Mawhinney | 342/44 |
| 4,730,188 A | 3/1988 | Milheiser | 340/825 |
| 4,839,642 A | 6/1989 | Batz et al. | 340/825.54 |
| 4,879,756 A | 11/1989 | Stevens et al. | 455/39 |
| 4,928,275 A | 5/1990 | Moore et al. | 370/102 |
| 4,937,586 A | 6/1990 | Stevens et al. | 343/702 |
| 4,955,038 A | 9/1990 | Lee et al. | 375/35 |
| 5,028,918 A | 7/1991 | Giles et al. | 340/825.54 |
| 5,041,826 A | 8/1991 | Milheiser | 340/825.54 |
| 5,109,221 A | 4/1992 | Lambropoulos et al. | 340/825.69 |
| 5,166,676 A | 11/1992 | Milheiser | 340/825.54 |
| 5,245,332 A | 9/1993 | Katzenstein | 340/825.54 |
| 5,305,008 A | 4/1994 | Turner et al. | 342/44 |
| 5,345,231 A | 9/1994 | Koo et al. | 340/870.31 |
| 5,410,315 A | 4/1995 | Huber | 342/42 |
| 5,489,908 A | 2/1996 | Orthmann et al. | 342/42 |
| 5,491,482 A | 2/1996 | Dingwall et al. | 342/42 |
| 5,502,445 A | 3/1996 | Dingwall et al. | 342/51 |
| 5,521,601 A | 5/1996 | Kandlur et al. | 342/44 |
| 5,525,992 A | 6/1996 | Froschermeier | 342/42 |
| 5,530,702 A | 6/1996 | Palmer et al. | 370/85.3 |

(Continued)

OTHER PUBLICATIONS

International Search Report and Written Opinion from PCT Application No. PCT/US2006/46341 mailed on Oct. 9, 2007.

(Continued)

*Primary Examiner* — Brian Zimmerman
*Assistant Examiner* — Cal Eustaquio
(74) *Attorney, Agent, or Firm* — Zilka-Kotab, PC (57) ABSTRACT

A circuit for recovering data from an incoming data stream according to one embodiment includes a capacitor and a substantially constant current source for charging the capacitor. A subcircuit generates a signal causing the capacitor to discharge upon detecting a first type of transition in the incoming data stream, the capacitor re-charging upon being at least partially discharged. A comparator compares a voltage on a node coupled to the capacitor to a reference voltage, the comparator outputting a first signal if the voltage on the node is higher than the reference voltage and outputting a second signal if the voltage on the node is lower than the reference voltage, the first signal being associated with a first logic value, the second signal being associated with a second logic value.

27 Claims, 9 Drawing Sheets

(56) References Cited

U.S. PATENT DOCUMENTS

| | | | |
|---|---|---|---|
| 5,548,291 A | 8/1996 | Meier et al. | 342/51 |
| 5,550,536 A | 8/1996 | Flaxl | 340/825.54 |
| 5,606,313 A | 2/1997 | Allen et al. | 340/825.54 |
| 5,621,412 A | 4/1997 | Sharpe et al. | 342/51 |
| 5,673,037 A | 9/1997 | Cesar et al. | 340/825.54 |
| 5,684,828 A | 11/1997 | Bolan et al. | 375/238 |
| 5,774,064 A | 6/1998 | Lambropoulos et al. | 340/825.69 |
| 5,790,607 A * | 8/1998 | Burke et al. | 375/355 |
| 5,838,257 A | 11/1998 | Lambropoulos | 340/825.54 |
| 5,856,788 A | 1/1999 | Walter et al. | 340/825.54 |
| 5,887,176 A | 3/1999 | Griffith et al. | 395/750 |
| 6,104,333 A | 8/2000 | Wood, Jr. | 341/173 |
| 6,130,602 A | 10/2000 | O'Toole et al. | 340/10.33 |
| 6,130,603 A | 10/2000 | Briechle | 340/10.34 |
| 6,150,921 A | 11/2000 | Werb et al. | 340/10.1 |
| 6,172,596 B1 | 1/2001 | Cesar et al. | 340/10.41 |
| 6,177,858 B1 | 1/2001 | Raimbault et al. | 340/10.1 |
| 6,239,690 B1 | 5/2001 | Burbidge et al. | 340/10.33 |
| 6,249,212 B1 | 6/2001 | Beigel et al. | 340/10.34 |
| 6,265,963 B1 | 7/2001 | Wood, Jr. | 340/10.4 |
| 6,278,698 B1 | 8/2001 | O'Toole et al. | 370/311 |
| 6,310,558 B1 | 10/2001 | Minami | 340/825.52 |
| 6,329,944 B1 | 12/2001 | Richardson et al. | 342/42 |
| 6,333,690 B1 | 12/2001 | Nelson et al. | 340/539 |
| 6,337,634 B1 | 1/2002 | O'Toole et al. | 340/825.56 |
| 6,342,830 B1 | 1/2002 | Want et al. | 340/10.1 |
| 6,351,215 B2 | 2/2002 | Rodgers et al. | 340/572.1 |
| 6,353,406 B1 | 3/2002 | Lanzl et al. | 342/118 |
| 6,362,738 B1 | 3/2002 | Vega | 340/572.1 |
| 6,388,575 B1 | 5/2002 | Galloway | 340/572.1 |
| 6,411,199 B1 | 6/2002 | Geiszler et al. | 340/10.1 |
| 6,452,980 B1 | 9/2002 | Zalud et al. | 375/285 |
| 6,466,634 B1 | 10/2002 | O'Toole et al. | 375/374 |
| 6,469,618 B1 | 10/2002 | Gaultier | 340/10.3 |
| 6,535,109 B1 | 3/2003 | Mahdavi | 340/10.3 |
| 6,593,845 B1 | 7/2003 | Friedman et al. | 340/10.33 |
| 6,600,428 B1 | 7/2003 | O'Toole et al. | 340/825.36 |
| 6,603,391 B1 | 8/2003 | Greeff et al. | 340/10.3 |
| 6,611,198 B1 | 8/2003 | Geiszler et al. | 340/10.41 |
| 6,617,963 B1 | 9/2003 | Watters et al. | 340/10.41 |
| 6,630,885 B2 | 10/2003 | Hardman et al. | 340/505 |
| 6,653,937 B2 | 11/2003 | Nelson et al. | 340/539.1 |
| 6,661,336 B1 | 12/2003 | Atkins et al. | 340/10.2 |
| 6,690,264 B2 | 2/2004 | Dalglish | 340/10.4 |
| 6,693,511 B1 | 2/2004 | Seal | 340/10.1 |
| 6,696,879 B1 | 2/2004 | O'Toole et al. | 327/356 |
| 6,721,289 B1 | 4/2004 | O'Toole et al. | 370/311 |
| 6,735,183 B2 | 5/2004 | O'Toole et al. | 370/311 |
| 6,765,476 B2 | 7/2004 | Steele et al. | 340/10.4 |
| 6,765,484 B2 | 7/2004 | Eagleson et al. | 340/505 |
| 6,771,613 B1 | 8/2004 | O'Toole et al. | 370/277 |
| 6,774,685 B2 | 8/2004 | O'Toole et al. | 327/156 |
| 6,781,353 B2 | 8/2004 | Rozsypal | 323/224 |
| 6,831,548 B1 | 12/2004 | Eber et al. | 340/10.33 |
| 6,971,058 B2 | 11/2005 | Evans et al. | 714/807 |
| 7,016,450 B2 * | 3/2006 | Lin et al. | 375/374 |
| 2001/0050580 A1 | 12/2001 | O'Toole et al. | 327/158 |
| 2002/0024422 A1 | 2/2002 | Turner et al. | 340/10.3 |
| 2002/0063622 A1 | 5/2002 | Armstrong et al. | 340/10.31 |
| 2002/0109597 A1 | 8/2002 | Nelson et al. | 340/573.1 |
| 2002/0126005 A1 | 9/2002 | Hardman et al. | 340/442 |
| 2002/0175805 A9 | 11/2002 | Armstrong et al. | 340/10.31 |
| 2002/0175806 A1 | 11/2002 | Marneweck et al. | 340/10.33 |
| 2003/0104848 A1 | 6/2003 | Brideglall | 455/574 |
| 2003/0128100 A1 | 7/2003 | Burkhardt et al. | 340/5.8 |
| 2003/0149526 A1 | 8/2003 | Zhou et al. | 701/213 |
| 2003/0178974 A1 | 9/2003 | Rozsypal | |
| 2004/0017291 A1 | 1/2004 | Hardman et al. | 340/505 |
| 2004/0027240 A1 | 2/2004 | Greeff et al. | 340/10.3 |
| 2004/0046642 A1 | 3/2004 | Becker et al. | 340/10.32 |
| 2004/0140884 A1 | 7/2004 | Gallagher, III et al. | 340/10.2 |
| 2004/0160306 A1 | 8/2004 | Stilp | 340/5.61 |
| 2004/0160309 A1 | 8/2004 | Stilp | 340/10.2 |
| 2004/0201457 A1 | 10/2004 | O'Toole et al. | 340/10.33 |
| 2004/0223481 A1 | 11/2004 | Juels et al. | 370/345 |
| 2005/0052283 A1 | 3/2005 | Collins et al. | 340/572.7 |
| 2005/0057368 A1 | 3/2005 | Corbett et al. | 340/825.49 |
| 2005/0077349 A1 | 4/2005 | Bonalle et al. | 235/380 |
| 2005/0121526 A1 | 6/2005 | Stewart et al. | |
| 2005/0220089 A1 * | 10/2005 | Kawashima | 370/366 |
| 2005/0225433 A1 * | 10/2005 | Diorio et al. | 340/10.4 |

OTHER PUBLICATIONS

International Preliminary Report on Patentability from PCT Application No. PCT/US06/46341 dated Jan. 28, 2011.
Chinese Office Action from Application No. 200680051389.6 mailed Jul. 6, 2011.
Japanese Office Action from Application No. 545640/2008 mailed Sep. 6, 2011.
Japanese Office Action from application No. 2008-545640 dated Feb. 5, 2013 (no translation).
Japanese Office Action from application No. 2008-545640 dated Sep. 4, 2012.

* cited by examiner

CLOCK-FREE ACTIVATION CIRCUIT

FIELD OF THE INVENTION

The present invention relates to activation circuits, and more particularly, this invention relates to low-power activation circuits for wireless devices.

BACKGROUND OF THE INVENTION

Receiving serial data from a source is normally performed by shifting pulses across a medium from one location to another. This medium can be electrical wire or Radio Frequency (RF) signals. When data is received at its destination, the clock and data must be recovered.

One technology area holding much promise for the future of data transmission is the emerging Radio Frequency Identification (RFID) technology. RFID technology employs an RF wireless link and ultra-small embedded computer chips. RFID technology enables such things as allowing physical objects to be identified and tracked via wireless "tags".

RFID systems, and particularly tags, are designed to operate on minimal power. Passive tags rely on the RF carrier signal for energy. The farther a passive tag is from the source of the carrier signal, the less power is generated. Accordingly, the range of a passive tag from the source of the carrier signal varies as a function of the power requirements of the tag.

Battery powered tags are constrained by a finite battery life, which in turn depends on power consumption. To extend the battery life, portions of active tags are typically powered down during a hibernate period. Upon receiving an activation signal, unpowered portions of the battery powered tag are activated. Thus, power consumption is critical in battery powered tags since any clock recovery circuit at the front end of a serial data input retrieval consumes power as it continuously samples the incoming signal for an activation signal.

Thus, in a low power tag, data signals must be decoded and recovered with minimum power. Current RFID clock recovery circuits use a Phase Locked Loop/Clock Data Recovery (PLL/CDR) circuit to recover the clock from an incoming data stream. One major problem is that the PLL circuit takes a long time to lock and consumes significant area and power, which is undesirable for RFID tags. The lock time can be reduced but it can never approach 2-3 cycles of preamble because it works in a feedback loop. Another traditional method to recover data is to over-sample the data at a higher frequency than the incoming data. Both of these methods consume unacceptable amounts of power, making the methods detrimental for implementation in RFID tags and impractical for such things as remote sensing devices.

What is needed is a low power circuit and method for recovering and decoding an incoming data pattern without requiring an active clock signal. What is also needed is a low power circuit and method for recovering and decoding an activation pattern, indicating that the device (e.g., tag) is to go from the hibernate state to the active state.

SUMMARY OF THE INVENTION

The present invention presents a low power circuit and method for recovering and decoding the pattern that indicates the device is to go from the hibernate state to the active state. The methods of data and clock recovery mentioned here can potentially reduce power consumption to 300 nanoAmps (nA) or less. This would result in 7.8 milliAmp (mA)-hours of current consumption in three years.

A circuit for recovering data from an incoming data stream according to one embodiment includes a capacitor and a substantially constant current source for charging the capacitor. A subcircuit generates a signal causing the capacitor to discharge upon detecting a first type of transition in the incoming data stream, the capacitor re-charging upon being at least partially or fully discharged. A comparator compares a voltage on a node coupled to the capacitor to a reference voltage, the comparator outputting a first signal if the voltage on the node is higher than the reference voltage and outputting a second signal if the voltage on the node is lower than the reference voltage, the first signal being associated with a first logic value, the second signal being associated with a second logic value.

A circuit for recovering data from an incoming data stream according to another embodiment includes a time-to-voltage converter for generating first and second signals based on transitions in an incoming data stream, the first signal being associated with a first logic value, the second signal being associated with a second logic value. The circuit also includes logic for identifying transitions in the incoming data stream, the transitions being used to identify individual logic values from the first and second signals.

The circuits presented herein may further include logic for detecting a pattern in the incoming data stream based on the first and second signals. This logic may, for example, generate an interrupt upon detecting the pattern. In further embodiments, additional circuitry is activated upon generation of the interrupt, the additional circuitry being for detecting an activate code in the incoming data stream. The additional circuitry may activate a host device upon detecting the activate code in the incoming data stream.

To eliminate the need for an external clock, transitions in the incoming data stream may be used to identify and store individual logic values.

The circuits presented herein are well adapted for use as part of an activation system of a Radio Frequency Identification (RFID) tag.

A method for recovering data from an incoming data stream includes charging a capacitor and sequentially performing the following sequence: discharging the capacitor upon detecting a first type of transition in the incoming data stream and charging the capacitor after the capacitor is at least partially or fully discharged. A voltage on a node coupled to the capacitor is compared to a reference voltage. A first signal is output if the voltage on the node is higher than the reference voltage, the first signal being associated with a first logic value. A second signal is output if the voltage on the node is lower than the reference voltage, the second signal being associated with a second logic value.

A pattern can be detected in the incoming data stream based on the first and second signals. An interrupt can be generated upon detecting the pattern. Additional circuitry may be activated upon generating the interrupt. The additional circuitry may, for example, analyze the incoming data stream for detecting an activate code in the incoming data stream. If the activate code is detected in the incoming data stream, the additional circuitry may activate a host device.

Another method for recovering data in an incoming data stream, includes using a time-to-voltage converter to generate first and second signals based on transitions in an incoming data stream. The first signal is output if the voltage of the time-to-voltage converter is higher than a reference voltage, the first signal being associated with a first logic value. A second signal is output if the voltage of the time-to-voltage converter is lower than the reference voltage, the second signal being associated with a second logic value. Transitions in the incoming data stream are used to identify individual logic values from the first and second signals.

A RFID system includes a plurality of RFID tags having one or more of the circuits described above or performing a method described above, and an RFID interrogator in communication with the RFID tags.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

The following specification describes systems and methods which can recover, decode and/or identify a particular data pattern in an incoming data stream with very low power consumption and without reliance on a clock signal.

Many types of devices can take advantage of the embodiments disclosed herein, including but not limited to Radio Frequency Identification (RFID) systems and other wireless devices/systems; pacemakers; portable electronic devices; audio devices and other electronic devices; smoke detectors; etc. To provide a context, and to aid in understanding the embodiments of the invention, much of the present description shall be presented in terms of an RFID system such as that shown in FIG. 1. It should be kept in mind that this is done by way of example only, and the invention is not to be limited to RFID systems, as one skilled in the art will appreciate how to implement the teachings herein into electronics devices in hardware and/or software. Examples of hardware include Application Specific Integrated Circuits (ASICs), printed circuits, monolithic circuits, reconfigurable hardware such as Field Programmable Gate Arrays (FPGAs), etc. Further, the methodology disclosed herein can also be incorporated into a computer program product, such as a computer disc containing software. Further, such software can be downloadable or otherwise transferable from one computing device to another via network, nonvolatile memory device, etc.

Figure 1:
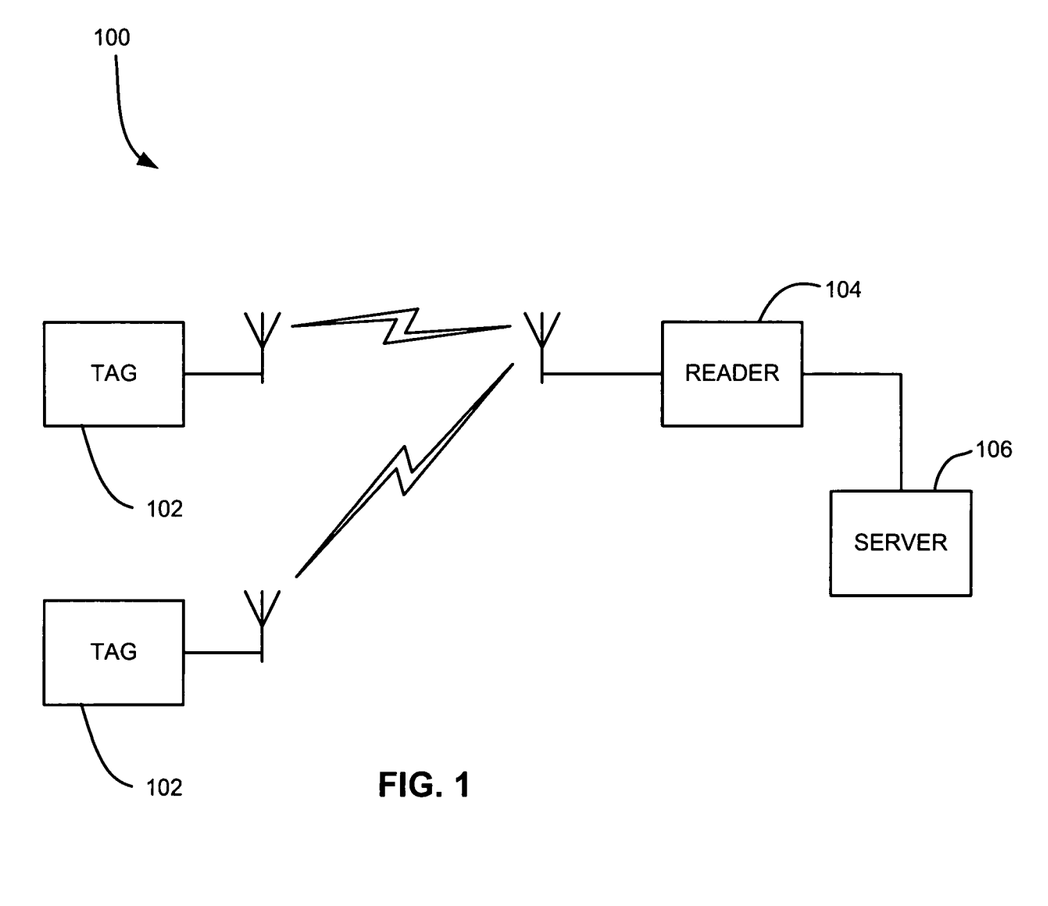
FIG. 1 is a system diagram of an RFID system.

As shown in FIG. 1, an RFID system 100 includes a tag 102, a reader 104, and an optional server 106. The tag 102 includes an IC chip and an antenna. The IC chip includes a digital decoder needed to execute the computer commands that the tag 102 receives from the tag reader 104. The IC chip also includes a power supply circuit to extract and regulate power from the RF reader; a detector to decode signals from the reader; a backscatter modulator, a transmitter to send data back to the reader; anti-collision protocol circuits; and at least enough memory to store its EPC code.

Communication begins with a reader 104 sending out signals to find the tag 102. When the radio wave hits the tag 102 and the tag 102 recognizes and responds to the reader's signal, the reader 104 decodes the data programmed into the tag 102. The information is then passed to a server 106 for processing, storage, and/or propagation to another computing device. By tagging a variety of items, information about the nature and location of goods can be known instantly and automatically.

Many RFID systems use reflected or "backscattered" radio frequency (RF) waves to transmit information from the tag 102 to the reader 104. Since passive (Class-1 and Class-2) tags get all of their power from the reader signal, the tags are only powered when in the beam of the reader 104.

The Auto ID Center EPC-Compliant tag classes are set forth below:

Class-1
  Identity tags (RF user programmable, maximum range 3 m)
  Lowest cost
Class-2
  Memory tags (8 bits to 128 Mbits programmable at maximum 3 m range)
  Security & privacy protection
  Low cost
Class-3
  Semi-Active tags
  Battery tags (256 bits to 64 Kb)
  Self-Powered Backscatter (internal clock, sensor interface support)
  100 meter range
  Moderate cost
Class-4
  Active tags
  Active transmission (permits tag-speaks-first operating modes)
  Up to 30,000 meter range
  Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (also known as active or semipassive), batteries are the most common form of power. This greatly increases read range, and the reliability of tag reads, because the tag doesn't need power from the reader. Class-3 tags only need a 10 mV signal from the reader in comparison to the 500 mV that a Class-1 tag needs to operate. This 2,500:1 reduction in power requirement permits Class-3 tags to operate out to a distance of 100 meters or more compared with a Class-1 range of only about 3 meters.

Figure 2:
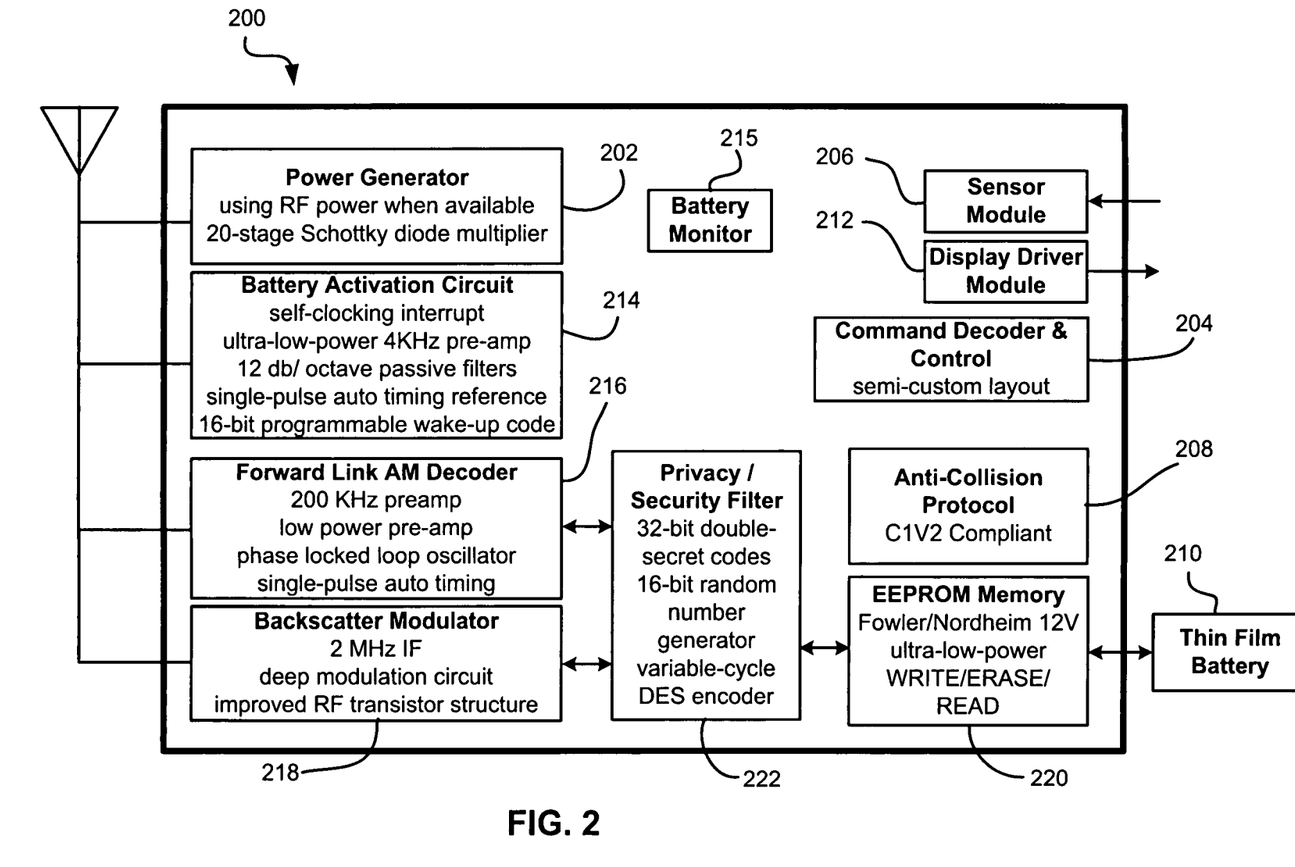
FIG. 2 is a system diagram for an integrated circuit (IC) chip for implementation in an RFID tag.

Embodiments of the present invention are preferably implemented in a Class-3 or higher Class chip. FIG. 2 depicts a circuit layout of a Class-3 chip 200 according to an illustrative embodiment for implementation in an RFID tag. This Class-3 chip can form the core of RFID chips appropriate for many applications such as identification of pallets, cartons, containers, vehicles, or anything where a range of more than 2-3 meters is desired. As shown, the chip 200 includes several industry-standard circuits including a power generation and regulation circuit 202, a digital command decoder and control circuit 204, a sensor interface module 206, a C1V2 interface protocol circuit 208, and a power source (battery) 210. A display driver module 212 can be added to drive a display.

A battery activation circuit 214 is also present to act as a wake-up trigger. In brief, the battery activation circuit 214 may include an ultra-low-power, narrow-bandwidth preamplifier with an ultra low power static current drain. The battery activation circuit 214 may also include a self-clocking interrupt circuit and uses an innovative user-programmable digital wake-up code. The battery activation circuit 214 draws less power during its sleeping state and is much better protected against both accidental and malicious false wake-up trigger events that otherwise would lead to pre-mature exhaustion of the Class-3 tag battery 210.

A battery monitor 215 can be provided to monitor power usage in the device. The information collected can then be used to estimate a useful remaining life of the battery.

A forward link AM decoder 216 uses a simplified phase-lock-loop oscillator that requires an absolute minimum amount of chip area. Preferably, the circuit 216 requires only a minimum string of reference pulses.

A backscatter modulator block 218 preferably increases the backscatter modulation depth to more than 50%.

A memory cell, e.g., EEPROM is also present. In one embodiment, a pure, Fowler-Nordheim direct-tunneling-through-oxide mechanism 220 is present to reduce both the WRITE and ERASE currents to less than 0.1 $\mu$A/cell in the EEPROM memory array. Unlike any RFID tags built to date, this will permit designing of tags to operate at maximum range even when WRITE and ERASE operations are being performed.

The module 200 may also incorporates a highly-simplified, yet very effective, security encryption circuit 222. Other security schemes, secret handshakes with readers, etc. can be used.

Only four connection pads (not shown) are required for the chip 200 to function: Vdd to the battery, ground, plus two antenna leads to support multi-element omni-directional antennas. Sensors to monitor temperature, shock, tampering, etc. can be added by appending an industry-standard I2C interface to the core chip.

It should be kept in mind that the present invention can be implemented in any type of tag, and the circuit 200 described above is presented as only one possible implementation.

The description below describes a circuit that can recover and decode a pattern in an incoming signal. To place the invention in context, much of the description will be written in terms of a tag activation process. However, it is to be understood that the circuits described herein have application beyond such activation processes and systems.

Figure 3:
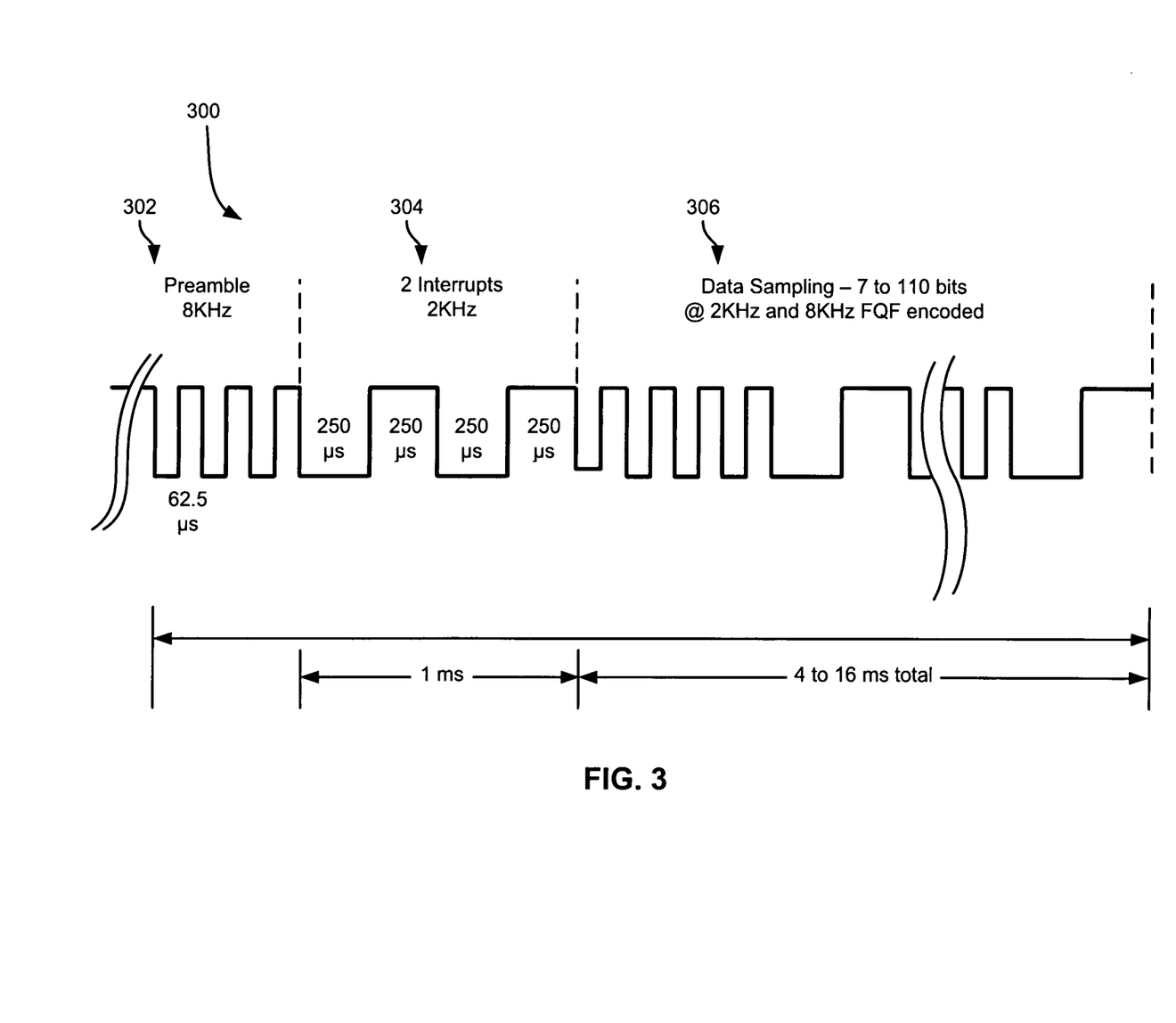
FIG. 3 is a depiction of an incoming data stream containing an activate command.

FIG. 3 illustrates an exemplary incoming data signal waveform 300, as received from an Amplitude Modulation (AM) detector. In this example, the waveform 300 is of an activate command of the type used in an activate circuit described in copending U.S. patent application Ser. No. 11/007,973 filed Dec. 8, 2004 with title "BATTERY ACTIVATION CIRCUIT", which is incorporated by reference herein.

The basic features of the "Activate" command 300 are:

A preamble 302 including an optional clock synchronization section. This section is typically used by activate circuits to define the clocking period. However, because no clock is required by various embodiments of the present invention, the preamble 302 may or may not be included or relevant.

An interrupt 304 to synchronize the start of a command with sufficient difference from "normal" commands (such as a timing violation in the forward communications protocol, or a "cluster" of bits that the device recognizes as an interrupt). This section may be used by the circuits described below to initiate comparison of the incoming data to a stored value.

An activate code 306 to allow potentially selective, subset of all tags, or all-inclusive tag activation.

The preamble portion 302 of the Activate command 300 preferably includes a predefined clock synchronization signal at an incoming rate of, for example, 8 KHz, which in this example represents a logic-0.

The next section is the Interrupt or violation section 304. This may include, for example, two cycles of 50% duty cycle based on a 2 KHz incoming rate (two instances of a logic-1). The interrupt marks the beginning of the code section which is the third component of the Activate command. By observing the interrupt portion 304, the receiver (tag) will realize that it has received an "Activate" command. Correct reception of the interrupt portion 304 moves the tag from the hibernate state into the code search state. A device (tag) preferably will only stay in the code search state for a maximum time period, such as 1-5 ms, preferably ~2 ms. If the tag is not moved into the ready or active state within that time, the tag will automatically revert back into the hibernate state. A circuit for generating a timeout period without requiring a running clock is also described below.

The receiving device listens for the interrupt, in this example a logic 1-1 in sequence. Upon encountering any logic 1-1, the device then processes the incoming activate code 306 as described below. If a value in the next sequence of bits matches a value stored locally on the receiving device, the device wakes up. If one of the bits in the sequence fails to match, the device resets, looks for the next interrupt, and begins monitoring the sequence of bits after the next interrupt (here, logic 1-1). It should be noted that a logic 1-1 in the activate code portion 306 will not cause the device to begin analyzing the incoming bit stream again because the interrupt detection circuit will not function after issuing an interrupt signal until either the activation code search is completed or a pre-set time-out period is reached. However, if the code does not match the device will reset again.

The activate code portion 306, according to one embodiment, can be described in two parts: first the signaling or communications protocol, and second the command protocol. Signaling can be described as two different frequencies where, for example, a one is observed as a 2 KHz tone and a zero is observed as an 8 KHz tone. These two tones (otherwise described as FQF for frequency, quad frequency) describe a command, which when matching an internal register, move the tag from a hibernate state to an active state (ready state in the state machine).

While the tag is waiting to activate, preferably no clock is running in order to minimize power consumption. The following description describes how an activate command 300 can be decoded and identified from an incoming data stream without requiring an incoming clock signal. Again, it should be noted that the incoming data stream need not be an activate command as presented here by way of example, but rather can be any incoming signal.

With a specific incoming data sequence of known pulse widths, such as where one pulse width is 4× the other pulse width as in the preamble portion 302 or interrupt portion 304 of the activate command 300 (FIG. 3), frequency to voltage conversion is used to differentiate the different pulse widths. In other words, the frequency can be determined using a time-to-voltage converter to store a voltage corresponding to the reference frequency of the input data. The time-to-voltage converter in turn generates signals representing the high and low frequency pulses in the incoming data stream.

Figure 4:
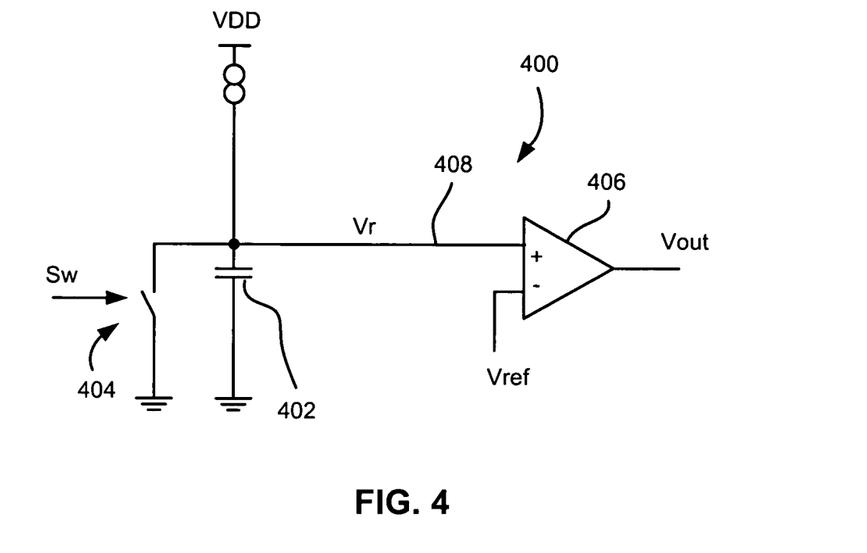
FIG. 4 is a circuit diagram of a time-to-voltage converter according to one embodiment of the present invention.

FIG. 4 illustrates a time-to-voltage converter 400 according to one embodiment. Functionally, the time-to-voltage converter 400 in the analog data recovery block employs a constant current source to charge a capacitor 402. The capacitor 402 is preferably a fixed capacitor, but can be any device capable of storing a charge and having a predictable rate of charging and discharging. The current source can include a circuit that manages current from a battery, a circuit that manages current from an RF-based power generator, or even a raw feed from a battery or power generator. When a voltage V featuring a slope dT is applied to the capacitor 402, it pushes a current into the capacitor of: $I=C*dV/dT$. Making use of the relationship $I=C*dV/dT$, the input frequency can be stored on a capacitor by converting the incoming signal to an input voltage. The stored charge can then be used to identify the input frequency. This is accomplished by using a current to charge the capacitor 402 during each data pulse. At each negative edge of the data stream, a signal Sw closes the switch 404, and the capacitor 402 is discharged. Thus, the capacitor 402 will charge from the time it is fully discharged caused by one negative edge until being again discharged by another negative edge. An illustrative value of the current source is less than about 100 nanoAmperes (nA), e.g., 1-10 nA.

Figure 5:
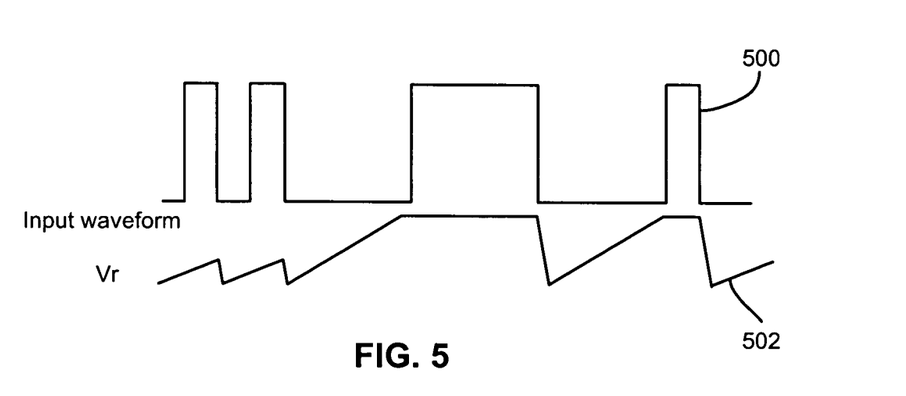
FIG. 5 is a depiction of illustrative waveforms of an incoming data stream and a voltage generated on a capacitor of the circuit of FIG. 4.

FIG. 5 depicts the correlation of the input waveform 500 (incoming baseband data stream) and the waveform 502 of the voltage Vr generated by the capacitor. As shown, the capacitor generated voltage Vr falls to ground through the switch 404 as the capacitor discharges at the falling edge of the input waveform, then increases until reaching a maximum value, or the capacitor is again discharged at the next falling edge.

Figure 6:
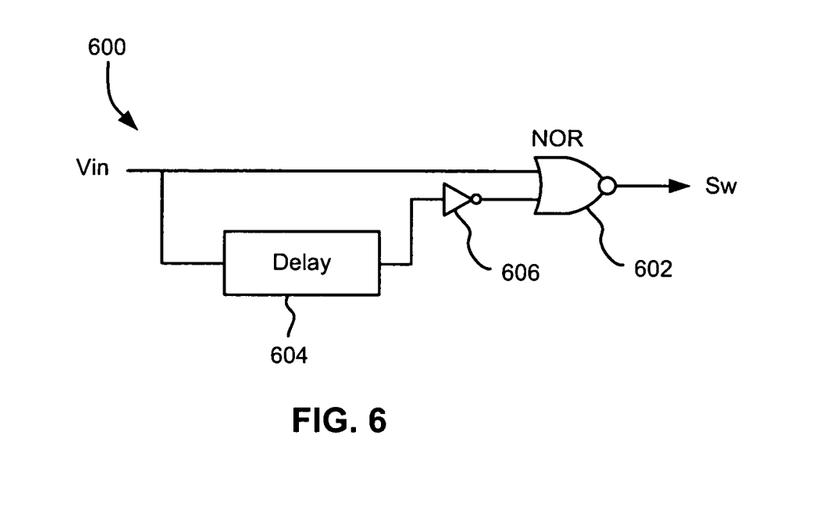
FIG. 6 is a circuit diagram of a switch signal generator according to one embodiment of the present invention.

As mentioned above, the reset of the capacitor 402 (FIG. 4) is triggered by a pulse Sw generated from the falling edge of the input waveform. One type of circuit 600 to generate this pulse is show in FIG. 6. As shown, the circuit 600 is a one-shot circuit that generates a one-shot signal pulse Sw by sensing the falling edge transition of the incoming data stream in logic. The pulse Sw preferably closes the switch long enough to substantially fully discharge the capacitor. The circuit 600 includes a NOR gate 602 having as inputs the raw baseband data stream Vin, and a baseband data stream delayed by a delay module 604 and also inverted by an inverter 606.

The time constant of the capacitor is important, as it should correlate somewhat to the 8 or 2 kHz period (or whichever period is being used) in the sense that the time constant allows differentiation between the two pulse widths. Referring again to FIG. 4, the generated voltage Vr on the node 408 coupled to the capacitor 402 between any two consecutive falling edges is compared to a pre-determined reference voltage Vref in a comparator 406. The comparator 406 can be a standard analog comparator, a digital comparator, etc. If the generated voltage Vr is larger than the reference voltage Vref, the data received from the RFID reader during that time period will be recovered as a digital bit of logic-1, as indicated by the output voltage Vout. A digital bit of logic-1 is equivalent to a time period of 2 KHz. If the generated voltage Vr is smaller than the predetermined reference voltage Vref, the data will be recovered as a digital bit of logic-0, which is equivalent to a time period of 8 KHz. An illustrative value for the reference voltage Vref is between about 0.01V and about 1 V, e.g., 0.5V.

Figure 7:
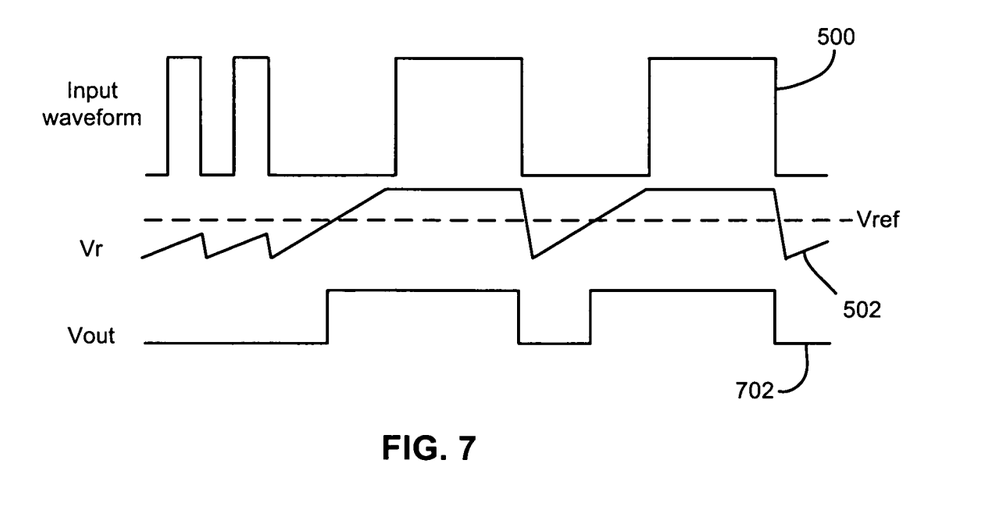
FIG. 7 is a depiction of illustrative waveforms of an incoming data stream, a voltage generated on a capacitor of the circuit of FIG. 4, and an output of the circuit of FIG. 4

FIG. 7 graphically illustrates the correlation of the input waveform 500 (incoming baseband data stream) and the waveform 502 of the voltage Vr generated by the capacitor to the waveform 702 of the comparator output Vout. As shown, when the incoming signal is at a high frequency (8 kHz), the capacitor generated voltage Vr does not exceed the reference voltage Vref and the comparator output signal Vout stays low, and may be zero volts. When the incoming signal is at a low frequency (2 kHz), the capacitor generated voltage Vr exceeds the reference voltage Vref and the comparator output Vout goes high.

Figure 8:
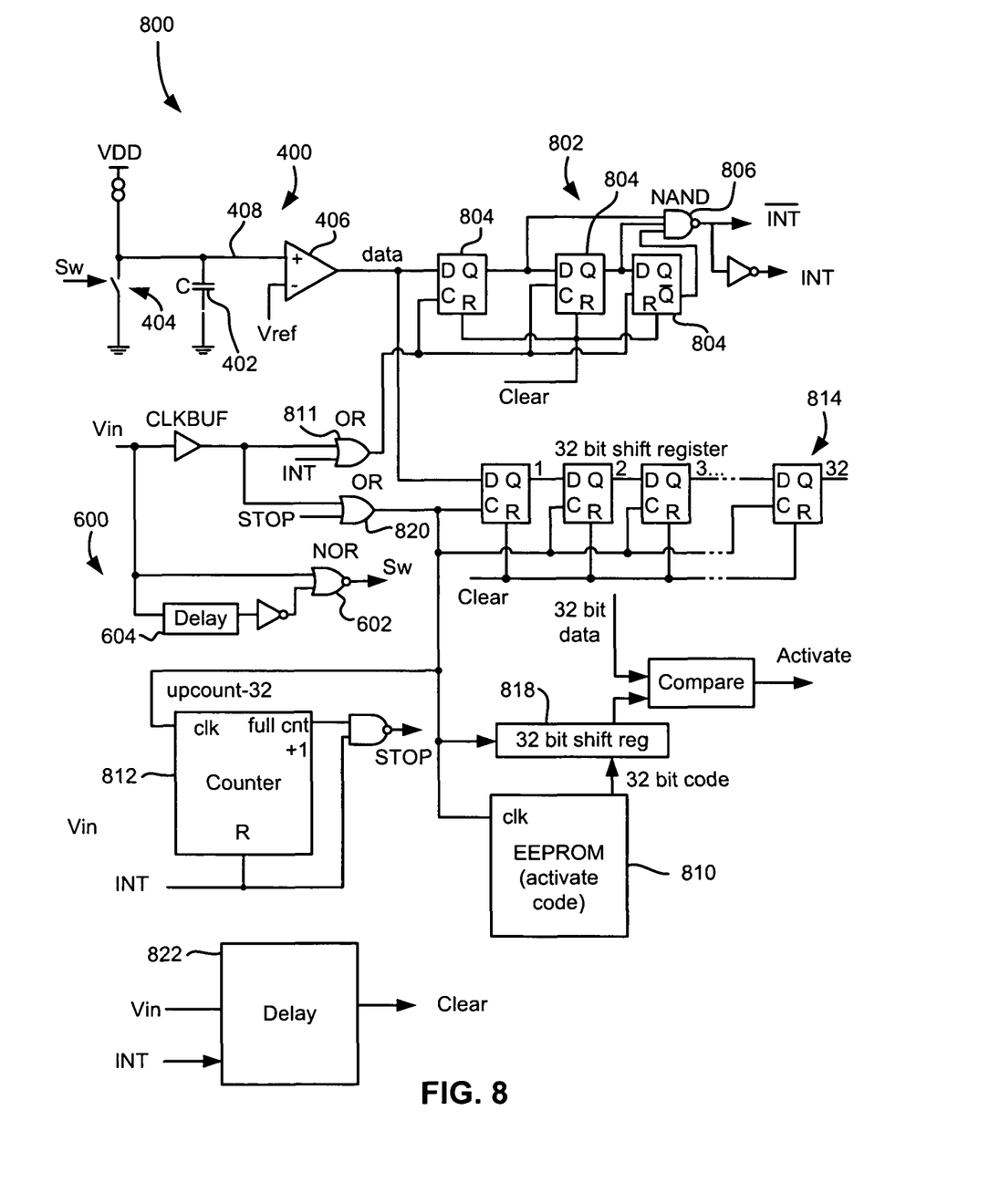
FIG. 8 is a circuit diagram of an activation circuit according to one embodiment.

FIG. 8 illustrates a circuit 800 for activating a device according to one embodiment. As described above, an activation command may include some number of cycles (e.g., 5-10 high frequency cycles) for clock sync, then two cycles of 2 kHz (two logic-1s) to indicate an interrupt.

On the device, in the example where a logic-1-1 triggers the interrupt, only the first stage of the activation circuit consumes switching current until the first two consecutive logic-1 data pulses in the incoming stream initiate an interrupt signal that triggers activation of additional portions of the activation circuit 800. After issuing an interrupt, the logic searching for the interrupt in the incoming data stream is preferably stopped. The capacitor continues to be charged and discharged in relation to the incoming data pattern of 2 KHz or 8 KHz pulse width data. The clock recovered is the data that is passed to additional logic to serially capture the data. The data is determined by the pulse width with a 2 KHz signal represented as a logic-1 and an 8 Khz pulse represented as a logic-0 (or vice versa). Depending on the specific input data stream after interrupt, e.g., if the data stream matches an activate command, the rest of the device may then activate. This activation preferably disables the activation circuit and data will then pass directly to the general logic section of the device and be recovered by conventional clock oversampling means. After the activation sequence is complete, unnecessary portions of the device de-activate and the activation circuit is enabled to again monitor the incoming data stream for the interrupt pattern and activation sequence.

With continued reference to FIG. 8, output of the time-to-voltage converter 400 is passed into an interrupt detection circuit 802. The interrupt detection circuit 802 includes a plurality of flip flops 804 (e.g., shift register type), which preferably start with all 0 values. The interrupt detection circuit 802 does not rely on a clock to shift data through the flip flops. Rather, the timing of the shifting relies on the data transition edges of the incoming baseband signal Vin. Particularly, the data shifts through the flip flops on each rising or falling edge. An NAND gate 806 detects the logic-1-1 (interrupt) in the incoming data stream, and goes high to indicate that the interrupt was found in the incoming data stream. The interrupt signal INT thus generated indicates that the incoming data stream should be analyzed for presence of a valid activate code. Once the interrupt is found, the interrupt-matching flip flop array 802 is preferably frozen to avoid the unwanted interrupt match during the activation code search period. This is accomplished in this embodiment by passing the interrupt signal INT to an OR gate 811 to stop the clock signal passing through.

If a value in the next sequence of bits matches a value stored locally on the receiving device, here in EEPROM 810, the device wakes up (as described below). If one of the bits in the sequence fails to match, the device resets, looks for the next interrupt, and begins monitoring the sequence of bits after the next interrupt (here, logic 1-1). It should be noted that a logic 1-1 in the activate code portion 306 (FIG. 3) will not cause the device to begin analyzing the incoming bit stream again because the interrupt detection circuit will not function after issuing an interrupt signal until either the activation code search is completed or the pre-set time-out period is reached.

With continued reference to FIG. 8, when the interrupt signal INT goes high, a counter 812 is started to count the number of bits coming in.

Meanwhile, the data from the time-to-voltage converter 400 is passed to a digital block, along with a clock that is based on the high to low transitions (or vice versa) in the incoming data stream Vin. The data is clocked into a shift register 814. When 32 bits (or however many are used) are loaded into the shift register 814, as indicated by the counter 812, the values in the shift register 814 are compared with the activation code stored in memory 810 and optionally loaded into a second shift register 818. If the code matches, an activation signal Activate is generated.

When the activate signal Activate is sent, or when the counter 812 reaches a predetermined value (here, 32), a stop signal STOP is sent to stop the clock from being sent out to the digital block. This is accomplished in this embodiment by passing the stop signal STOP to an OR gate 820 to stop the clock signal passing through.

When all functions in the digital block have been completed, a clear signal Clear is generated. The clear signal Clear clears the register and interrupt flip flops, so that the circuit begins searching for an activate signal again. The clear signal Clear can be controlled, for example, by either power-on-reset or digital state machine.

A delay circuit 822 generates a timeout, e.g., >60 ms delay, which can trigger the clear signal Clear. The way the delay circuit fits in is that if noise gets into the incoming data stream or system, the circuit 800 may not recognize the activate code and the digital block remains inactive. If the interrogator, e.g., tag reader, does not receive a response back from the host device, the interrogator can resend the code until the host device responds.

One embodiment of the delay circuit 822 charges and discharges a capacitor, creating a ramp up and a ramp down. The charging and discharging of the capacitor continues in a loop. A clock is generated from the ramping. For example, the delay circuit 822 can use a 1 ms up and 1 ms down capacitor charge/discharge cycle, which creates a 2 ms pulse width. The charge up triggers a one shot. Then the current source is switched to charge the capacitor down. Once the capacitor charges down, the delay circuit creates another one shot. This cycle is repeated. The resulting signals are processed to generate sharp edges representing a clock signal.

The clock thus generated can be divided down until a prespecified time is reached. The delay circuit 822 then sends a timeout signal (which can be the same as the clear signal Clear), instructing the digital block to reset and begin searching for the activate code again. Thus, a delay is generated without requiring a clocking signal from outside the circuit, e.g., from a PLL/CDR.

Figure 9:
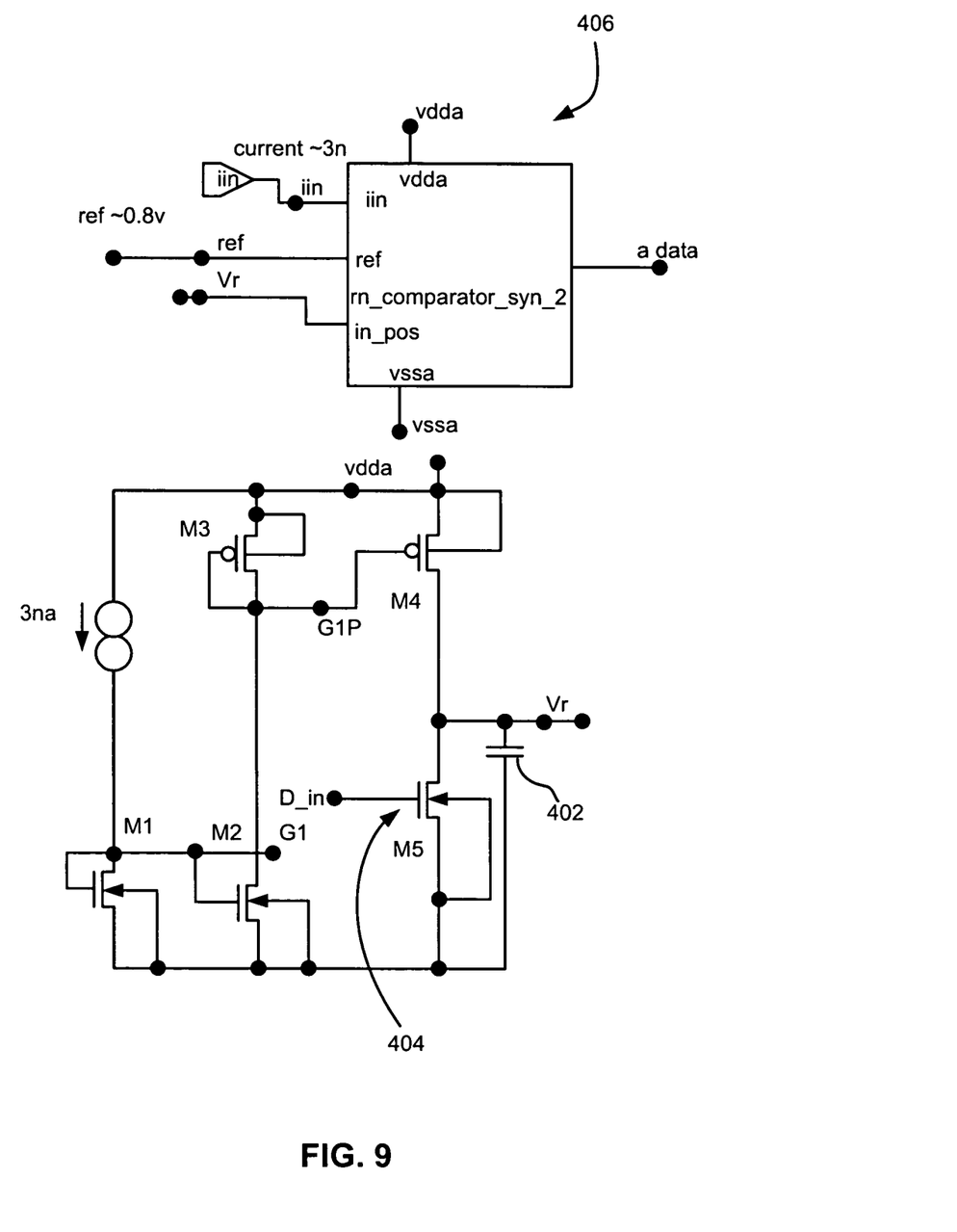
FIG. 9 is a circuit diagram of a source current generating circuit according to one embodiment of the present invention.
Figure 10:
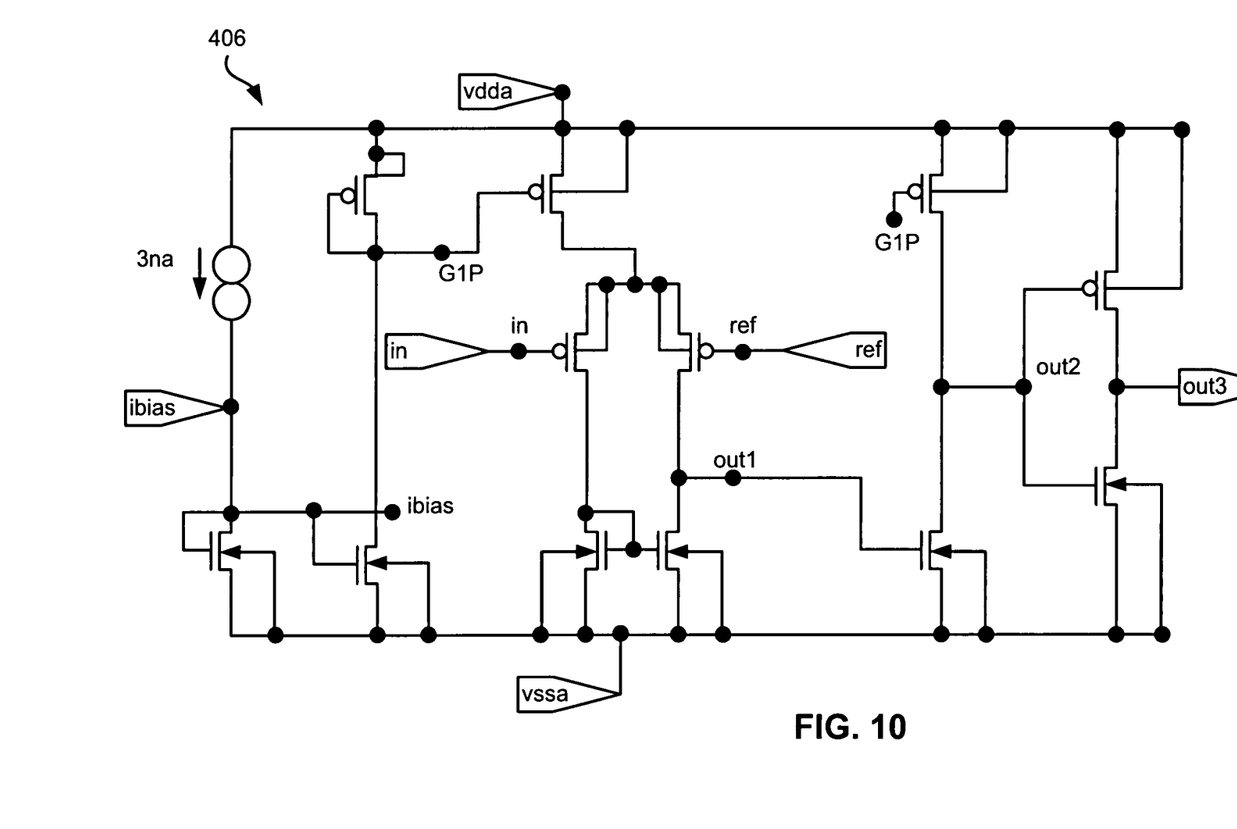
FIG. 10 is a circuit diagram of a comparator according to one embodiment of the present invention.
Figure 11:
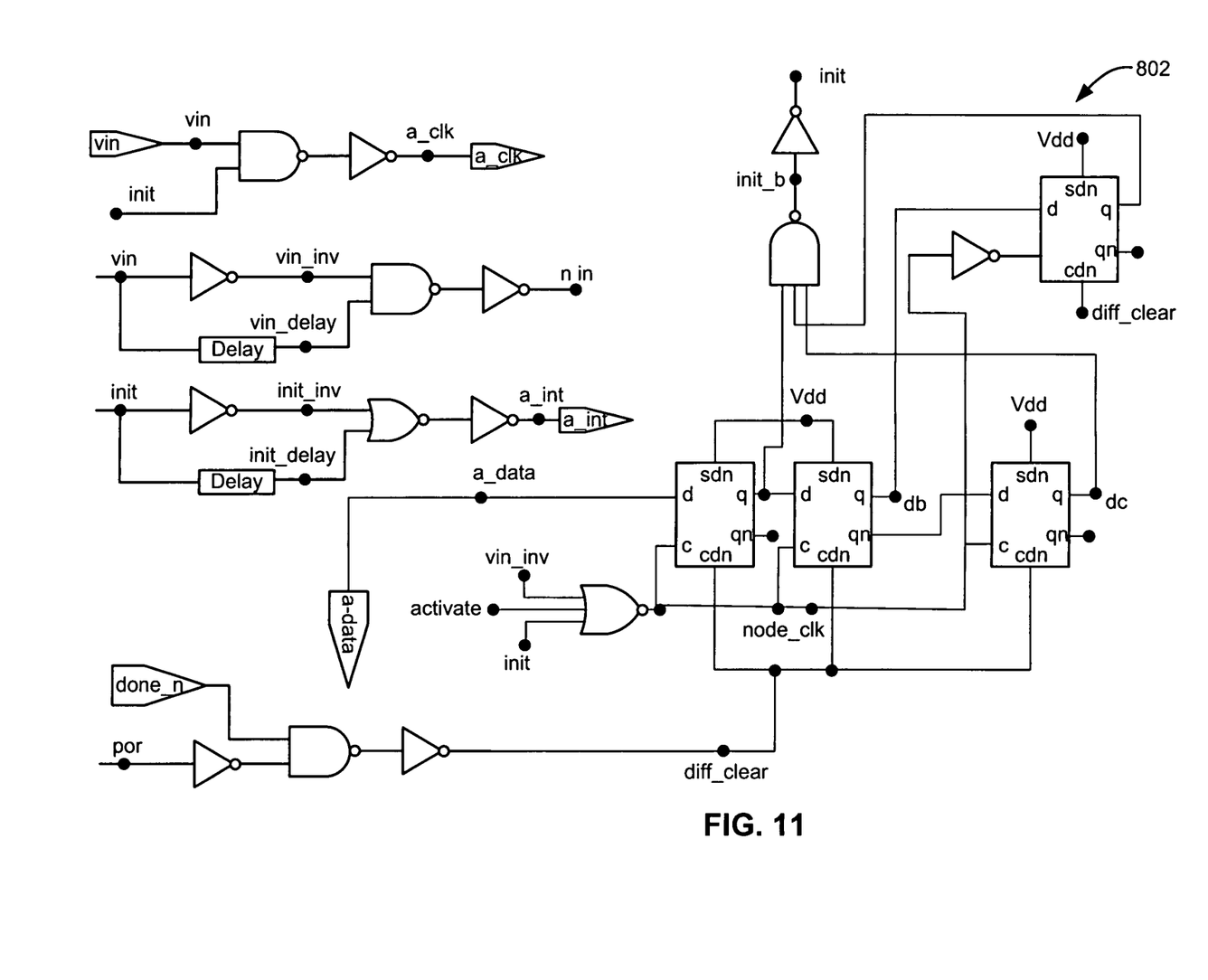
FIG. 11 is a circuit diagram of an interrupt decode and data/clock generation circuit according to one embodiment of the present invention.

FIGS. 9-11 illustrate exemplary implementations of various subcircuits that may, for example, be implemented in the circuit 800 of FIG. 8.

FIG. 9 is an implementation of the current source generator that charges the capacitor 402 of FIG. 4 or 8. A constant current is created by an on chip compensated current reference. This current is mirrored to M4 to create the charging current to charge the capacitor 402. M5 is an Nmos transistor used to discharge the capacitor on the falling edge of input data.

An implementation of the comparator 406 is shown in FIG. 10. This is a standard comparator biased at nanoamp current to minimize power. When IN is above REF, OUT1 goes high, OUT2 goes low and OUT3 goes high indicating high input data. REF is set at one half VDDA voltage.

Logic necessary to decode the initial interrupt sequence and then to pass data and clock to the next stage to determine that actual activation code sequence is shown in FIG. 11. Vin is the input data from which the interrupt sequence is to be determined. N_IN is a pulse created by the negative edge of Vin to discharge the capacitor to begin the capacitor charge timing sequence. The data logic-1 or logic-0 determined by the comparator is the input to a sequence of four flip-flops to determine the interrupt sequence. This data is clocked into the sequence of flip-flops by the input data. When the correct sequence is determined, init will go high creating a pulse indicating to the next stage the interrupt has been detected and that data and clock will be sent to evaluate the activation code sequence to determine if the tag should become active. An activate signal activate is sent back from the next stage to disable the interrupt decode block and after the tag active sequence is done, the tag will go into hibernation by activate going high and DONE_N will go low to initiate looking for interrupt again to determine if the tag should look for the activation sequence and activate.

The methods of data and clock recovery mentioned here can potentially reduce power consumption to 300 nA or less. This would result in 7.8 mA-hours of current consumption in three years.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A circuit, comprising: a capacitor;
   a substantially constant current source for charging the capacitor;
   a subcircuit for generating a signal causing the capacitor to discharge upon detecting a first type of transition in the incoming data stream, the capacitor charging upon being at least partially discharged; and
   a comparator for comparing a voltage on a node directly coupled to the capacitor against a reference voltage, the comparator outputting a first signal if the voltage on the node is higher than the reference voltage and outputting a second signal if the voltage on the node is lower than the reference voltage, the first signal being associated with a first logic value, the second signal being associated with a second logic value.

2. A circuit as recited in claim 1, further comprising logic for detecting a pattern in the incoming data stream based on the first and second signals.

3. A circuit as recited in claim 2, wherein the logic generates an interrupt upon detecting the pattern.

4. A circuit as recited in claim 3, further comprising additional circuitry being activated upon generation of the interrupt, the additional circuitry being for detecting an activate code in the incoming data stream.

5. A circuit as recited in claim 4, wherein the additional circuitry activates a host device upon detecting the activate code in the incoming data stream.

6. A circuit as recited in claim 1, wherein transitions in the incoming data stream are used to identify individual logic values.

7. A circuit as recited in claim 1, wherein the incoming data stream is a radio frequency signal.

8. A circuit as recited in claim 1, wherein the circuit is part of an activation system of a Radio Frequency Identification (RFID) tag.

9. A Radio Frequency identification RFID) system, comprising:
a plurality of RFID tags having the circuit of claim 1; and
an RFID interrogator in communication with the RFID tags.

10. A circuit for recovering data from an incoming data stream, comprising:
a time-to-voltage converter for generating first and second signals based on transitions in an incoming data stream, the first signal being associated with a first logic value, the second signal being associated with a second logic value; and
logic for identifying transitions in the incoming data stream, the transitions being used to identify individual logic values from the first and second signals;
the converter further including a comparator for comparing a voltage on a node directly coupled to the capacitor against a reference voltage, the comparator outputting the first signal if the voltage on the node is higher than the reference voltage and outputting the second signal if the voltage on the node is lower than the reference voltage, the first signal being associated with the first logic value, the second signal being associated with the second logic value.

11. A circuit as recited in claim 10, wherein the circuit is part of an activation system of a Radio Frequency Identification (RFID) tag.

12. A Radio Frequency Identification (RFID) system, comprising:
a plurality of RFID tags having the circuit of claim 10; and
an RFID interrogator in communication with the RFID tags.

13. A method for recovering data from an incoming data stream, comprising: charging a capacitor;
sequentially performing the following sequence:
discharging the capacitor upon detecting a first type of transition in the incoming data stream; charging the capacitor after the capacitor is at least partially discharged; comparing a voltage on a node directly coupled to the capacitor against a reference voltage;
outputting a first signal if the voltage on the node is higher than the reference voltage, the first signal being associated with a first logic value; and outputting a second signal if the voltage on the node is lower than the reference voltage, the second signal being associated with a second logic value.

14. A method as recited in claim 13, further comprising detecting a pattern in the incoming data stream based on the first and second signals.

15. A method as recited in claim 14, further comprising generating an interrupt upon detecting, the pattern.

16. A method as recited in claim 15, further comprising activating additional circuitry upon generating the interrupt.

17. A method as recited in claim 16, further comprising using the additional circuitry to analyze the incoming data stream for detecting an activate code in the incoming data stream.

18. A method as recited in claim 16, thither comprising wherein the additional circuitry activates a host device upon detecting an activate code in the incoming data stream.

19. A method as recited in claim 13, further comprising using transitions in the incoming data stream to identify individual logic values.

20. A method as recited in claim 13, wherein the incoming data stream is a radio frequency signal.

21. A Radio Frequency Identification (RFID) system, comprising:
a plurality of RFID tags performing the method of claim 13; and
an RFID interrogator in communication with the RFID tags.

22. A method for recovering data in an incoming data stream, comprising:
using a time-to-voltage converter to generate first and second signals based on transitions in an incoming data stream;
comparing a voltage of the incoming data stream on a node directly coupled to a capacitor against a reference voltage,
outputting the first signal if the voltage of the time-to-voltage converter is higher than a reference voltage, the first signal being associated with a first logic value;
outputting a second signal if the voltage of the time-to-voltage converter is lower than the reference voltage, the second signal being associated with a second logic value; and
using transitions in the incoming data stream to identify individual logic values from the first and second signals.

23. A Radio Frequency Identification (RFID) system, comprising:
a plurality of RFID tags performing the method of claim 22; and
an RFID interrogator in communication with the RFID tags.

24. A circuit as recited in claim 1, wherein the subcircuit is configured to cause the capacitor to fully discharge.

25. A method as recited in claim 13, further comprising closing a switch each time the first type of transition is detected in the incoming data stream, thereby discharging the capacitor each time the first type of transition is detected in the incoming data stream.

26. A method as recited in claim 13, wherein the capacitor to fully discharged upon detecting the first type of transition in the incoming data stream.

27. A circuit as recited in claim 1, wherein the subcircuit is configured to dose a switch each time the first type of transition is detected in the incoming data stream, thereby discharging the capacitor each time the first type of transition is detected in the incoming data stream.

* * * * *

UNITED STATES PATENT AND TRADEMARK OFFICE
CERTIFICATE OF CORRECTION

PATENT NO. : 8,548,098 B2
APPLICATION NO. : 11/305648
DATED : October 1, 2013
INVENTOR(S) : Shyu et al.

Page 1 of 1

It is certified that error appears in the above-identified patent and that said Letters Patent is hereby corrected as shown below:

In the claims:

col. 12, line 9 replace "thither" with --further--;

col. 12, line 56 replace "dose" with --close--.

Signed and Sealed this
Third Day of December, 2013

Margaret A. Focarino
*Commissioner for Patents of the United States Patent and Trademark Office*